UNITED STATES PATENT OFFICE.

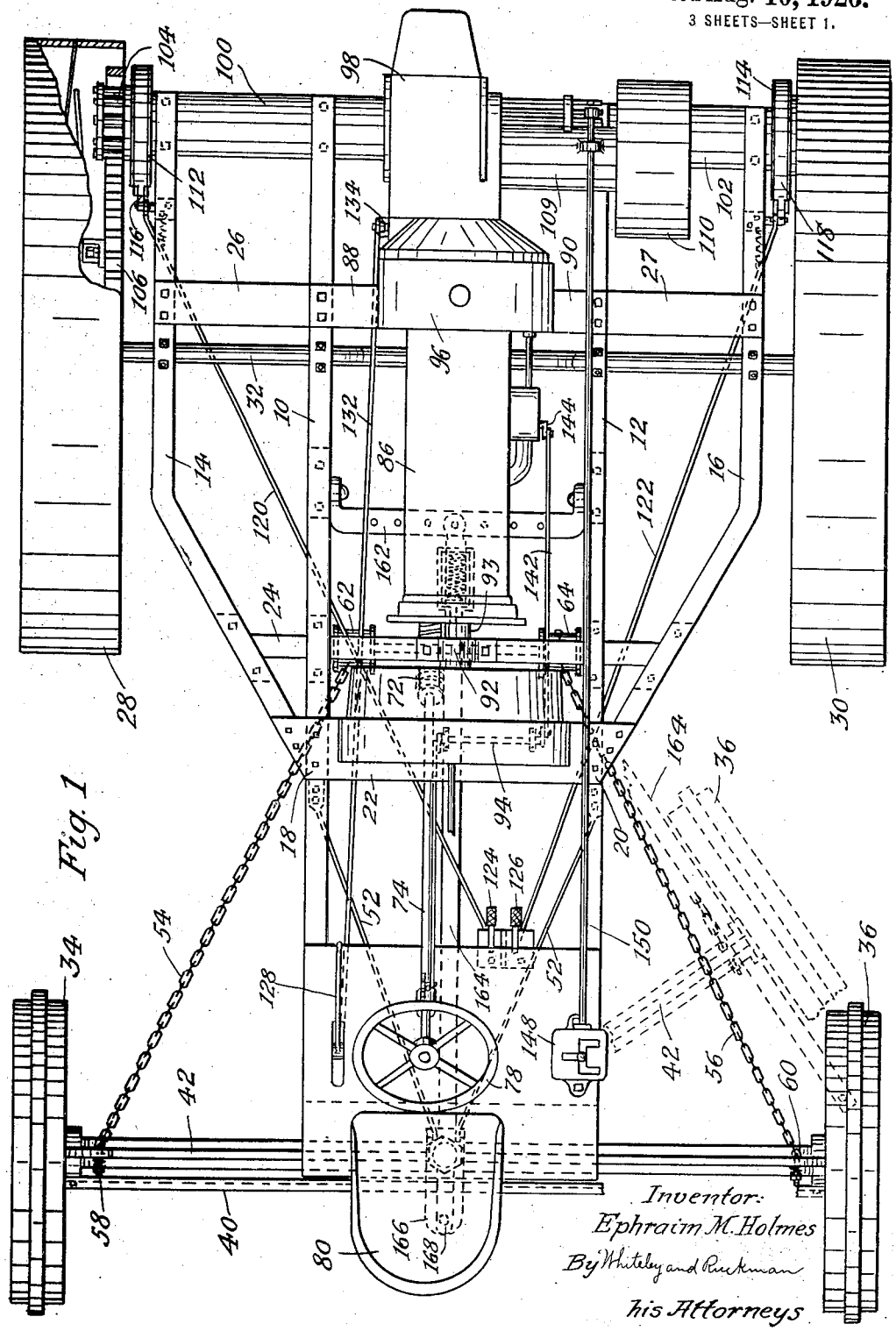

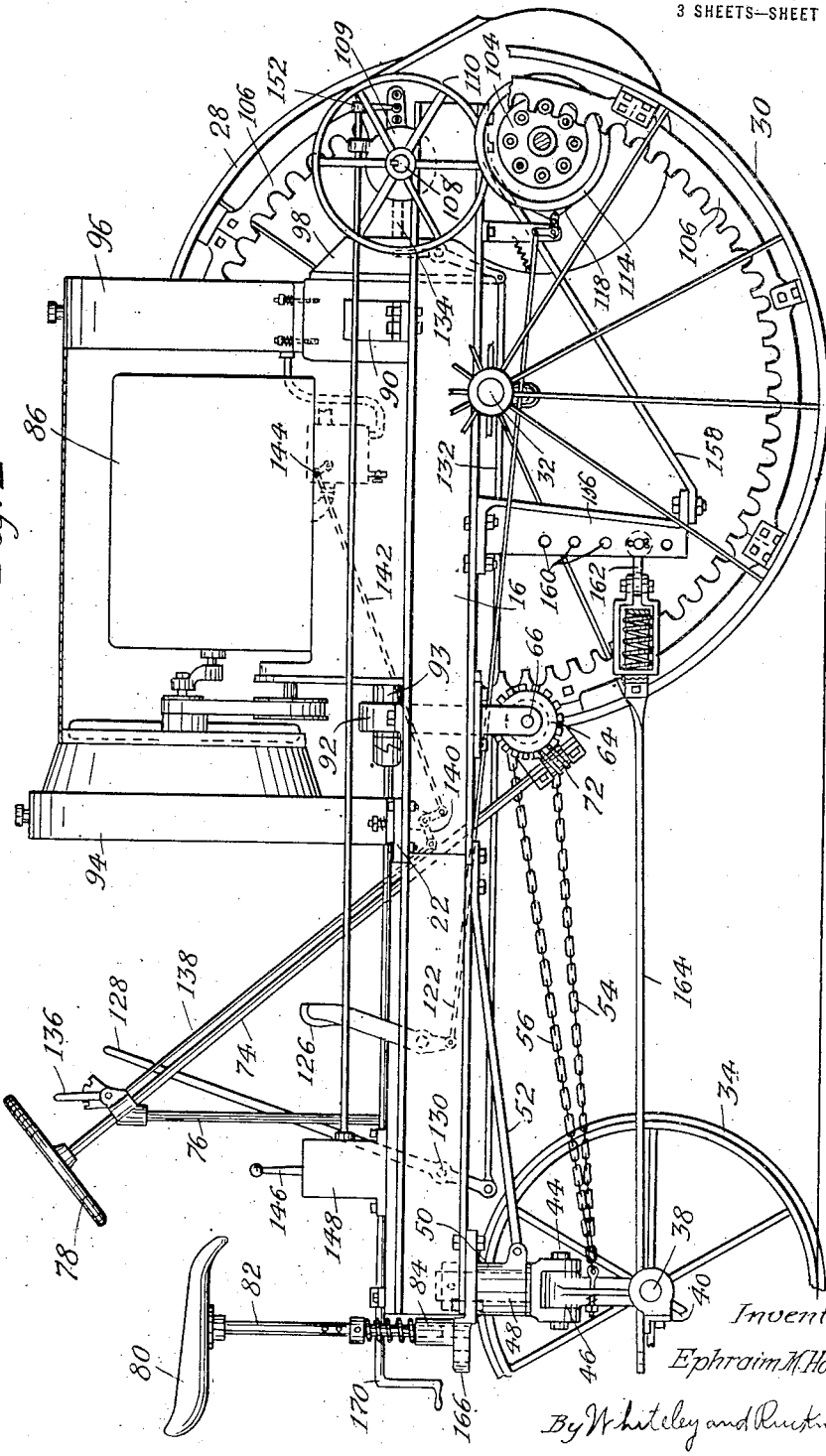

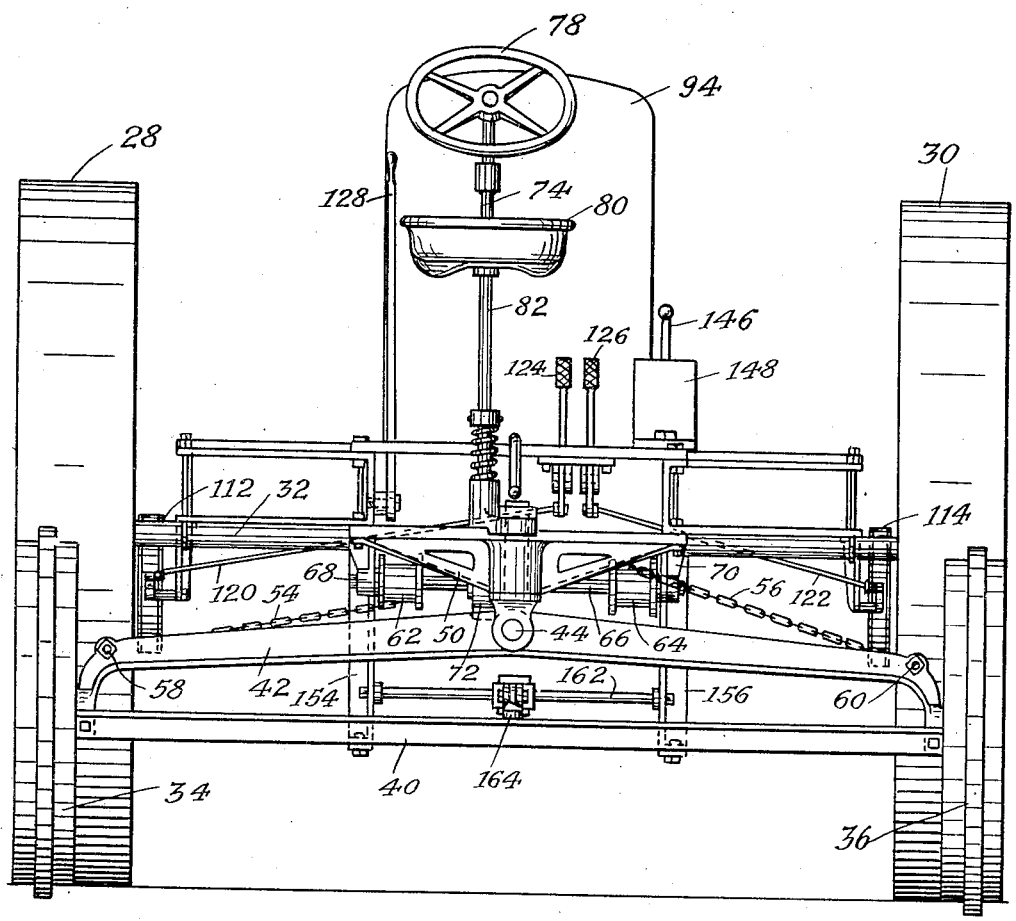

EPHRAIM M. HOLMES, OF MINNEAPOLIS, MINNESOTA, ASSIGNOR TO DANIEL E. FRENCH, OF STUART, FLORIDA.

TRACTION-ENGINE.

1,348,877.   Specification of Letters Patent.   Patented Aug. 10, 1920.

Application filed February 23, 1918. Serial No. 218,711.

*To all whom it may concern:*

Be it known that I, EPHRAIM M. HOLMES, a citizen of the United States, residing at Minneapolis, in the county of Hennepin and State of Minnesota, have invented certain new and useful Improvements in Traction-Engines, of which the following is a specification.

My invention relates to traction engines and has for its object to provide a tractor especially adapted for farm purposes having a frame supported by two large driving wheels at the front and two smaller steering wheels at the rear in such manner that I obtain a three-point support for the frame and also having the motor supported on the frame at three points thereby providing a construction which will operate over rough and ridged ground and upon side hills as effectively as upon level ground. A further object is to provide a construction whereby the tractor may turn square corners or may be faced in the opposite direction in a minimum space in order that the tractor may be employed to the best advantage for agricultural purposes. A further object is to provide a tractor which shall be balanced and free from all side strains which would tend to rack and weaken the structure. A further object is to provide a tractor having rear steering wheels which will follow in the track of the front drive wheels and which may be turned to a considerable extent for steering purposes without taking them outside of the track of the drive wheels.

The full objects and advantages of my invention will appear in connection with the detailed description thereof and are particularly pointed out in the claims.

In the drawings, illustrating the application of my invention in one form,—

Figure 1 is a plan view of the tractor showing a few of the parts in section. Fig. 2 is a side elevational view one of the steering wheels being removed and with one of the driving wheels partly broken away. Fig. 3 is a rear elevational view.

In carrying out my invention I provide a frame consisting of two parallel longitudinal beams 10 and 12 and two shorter beams 14 and 16 extending from the front of the frame and having their rear portions bent inwardly and secured to the longitudinal beams at 18 and 20 between the ends of said beams. The longitudinal members 10 and 12 are secured together by transverse frame members 22 and 24, while transverse members 26 and 27 secure the members 10 and 14 and 12 and 16 respectively. The frame is supported at its front by two drive wheels 28 and 30 rotatably mounted on a stationary shaft 32 secured by U-shaped pieces to the longitudinal members 10 and 12 and also secured to the short members 14 and 16. At the rear, the frame is supported by two steering wheels 34 and 36 which are about half the width of the drive wheels 28 and 30. The wheels 34 and 36 are mounted on stub shafts 38 which are secured to a curved bar 42 which is pivotally connected by horizontal pivot 44 to a forked member 46 the upper end of which is rotatably mounted in a vertical bearing 48 carried by a bracket 50 secured to the rear ends of the longitudinal frame members 10 and 12 and strengthened by braces 52. It thus becomes apparent that the frame is supported on four wheels but so far as movement is concerned is supported at three points, namely, at the pivot 44 and at the points where the shaft 32 passes through the hubs of the two drive wheels. The ends of the curved bar 42 are connected by a straight bar 40 which may be removed if desired for a purpose to be referred to later.

For operating the steering wheels, two chains 54 and 56 have their rear ends fastened to the curved bar 42 at 58 and 60 while their forward ends are wound in opposite directions as shown in Fig. 3 around drums 62 and 64 which are secured to a shaft 66 rotatably mounted in bearings formed on brackets 68 and 70 depending from the frame. For turning the shaft in either direction as desired, it is connected by worm gearing 72 with a shaft 74 supported by standard 76 and the shaft 74 has a hand wheel 78 at its upper end positioned within reach from an operator's seat 80 mounted upon an adjustable spring-supported rod 82 extending into a socket 84 at the rear of the frame.

The motor and transmission system with which my tractor is equipped are mounted toward the front of the frame, as best shown in Fig. 2. The motor, which is preferably an internal combustion engine, is designated by the character 86 and is supported at three points, two of which are at each side of the front thereof as indicated at 88 and 90 on the transverse members 26 and 27, and the third point of which is at the center and rear of the engine. This third point of support is constituted by a bearing 92 on the crossbar 24 into which fits a cylindrical extension 93 on the engine housing capable of turning in the bearing. On account of this method of mounting, the engine is not subjected to straining action when the tractor is operating over rough ground. A radiator and a fuel tank, indicated at 94 and 96, and the other parts common to engines of this type are located as shown in Figs. 1 and 2. The crankshaft of the engine drives the usual transmission device contained in the transmission casing 98 supplied with the customary differential, the differential shafts of which extend in opposite directions through cannon housings 100 and 102 for operating the two drive wheels, the shaft being operatively connected with the drive wheels through gears 104 meshing with internal gears 106 on the driving wheels. A countershaft 108 mounted in a cannon housing 109 has secured on its outer end, a belt pulley 110 for stationary power purposes. The housings 100 and 102 are secured to the front of the frame members and have the additional function of strengthening the frame.

Secured to each of the differential shafts are brake drums 112 and 114 with which brake bands 116 and 118 of ordinary construction are adapted to coöperate. The brake bands may be operated by rods 120 and 122 connected to pedals 124 and 126 within reach of the operator, so that the drive wheels 28 and 30 may be independently braked. The operation of an important feature of my invention is now readily apparent. If, for instance, the brake be applied to the right-hand drive wheel 30, as viewed in Fig. 1, and the hand wheel be operated to swing the steering wheels to the right, then the tractor will swing around the drive wheel 30 as a pivot and either a square turn or a right-about turn can be made. This is a particularly desirable feature in farm tractors and the advantage thereof will be referred to later in the statement of advantages at the end of the specification.

A clutch lever 128 is pivoted to the frame at 130 and through the rod 132 is adapted to operate the clutch 134 of ordinary construction. A throttle control handle 136 is pivoted to the bearing of the standard 76 and through the rod 138, bell-crank 140 and rod 142 is adapted to control the customary throttle 144. A gear shifter handle 146 is mounted in the quadrant 148 and is secured to one end of a rotatable and longitudinally-movable rod 150, the other end of which is adapted to operate a gear shifter 152 of the usual construction.

Depending from the longitudinal beams 10 and 12 toward the front ends thereof are two bracket members 154 and 156 which are strengthened by braces 158. A series of holes 160 are provided in each of these bracket members and a transverse rod 162 is adjustably positioned in these holes. A drawbar 164 is adjustably and pivotally connected to the bar 162 by means of a series of holes therein. If desired the drawbar 164 and the transverse bar 40 at the rear of the frame can be removed in order to leave the lower portion of the tractor open when used for cultivating. In this case the implement to be drawn may be connected to the lug 166 by means of a drawbar inserted in the hole 168. A starting crank for the engine is shown at 170.

The operation and advantages of my invention will be obvious from the foregoing description. By placing the large drive wheels in front a powerful tractive effect is obtained, while by placing steering wheels of lesser width than the drive wheels, so as to follow in the track of the latter, a very efficient steering arrangement is obtained. The steering wheels can be turned to a considerable extent without taking them outside of the track of the driving wheels, and steering is thus rendered easy. On account of the three-point support for the frame and also for the engine, a tractor is provided in which the whole structure is free from racking and straining, and which operates equally as well over rough and ridged ground and upon side hills as it does on level ground. The tractor is particularly advantageous for certain classes of agricultural work on account of the ease with which it may be turned in a minimum space in order to make a square turn or to face in the opposite direction. The manner in which the tractor and the implement drawn thereby can be turned in a very short space is apparent from the construction shown in dotted lines in Fig. 1. On account of the drawbar having a pivotal connection well toward the front of the tractor, it is apparent that the implement does not have to make the full swing of the rear end of the tractor frame, but, on the contrary, when the tractor is turned about one of the drive wheels at the front in the manner previously explained, the drawbar will assume the position shown in dotted lines and the implement will be drawn around into proper position for continuing its operation by moving it through a comparatively small space. A strong and adjustable drawbar connection operating in the manner above stated is thus provided for ordinary work, while for lighter work such as cultivating, a clear space may be provided beneath the tractor, as previously explained, so that the crops being cultivated will not be injured.

I claim:

1. A traction engine comprising a wheel supported frame having drive wheels at the front and steering wheels at the rear thereof, an arched axle connecting said steering wheels, a pivotal connection between said axle and said frame, and a removable bar connecting the ends of said axle.

2. A traction engine comprising a wheel supported frame having drive wheels at the front and steering wheels at the rear thereof, an arched axle connecting said steering wheels, a straight bar connecting the ends of said axle, and a draw-bar pivotally connected to said frame at a point remote from the rear thereof, the rear end of said draw-bar being slidably supported upon said straight bar.

In testimony whereof I hereunto affix my signature.

EPHRAIM M. HOLMES.